Aug. 8, 1967 M. V. FEY 3,335,239
MAGNETIC IMPACT SWITCH
Filed Nov. 19, 1964
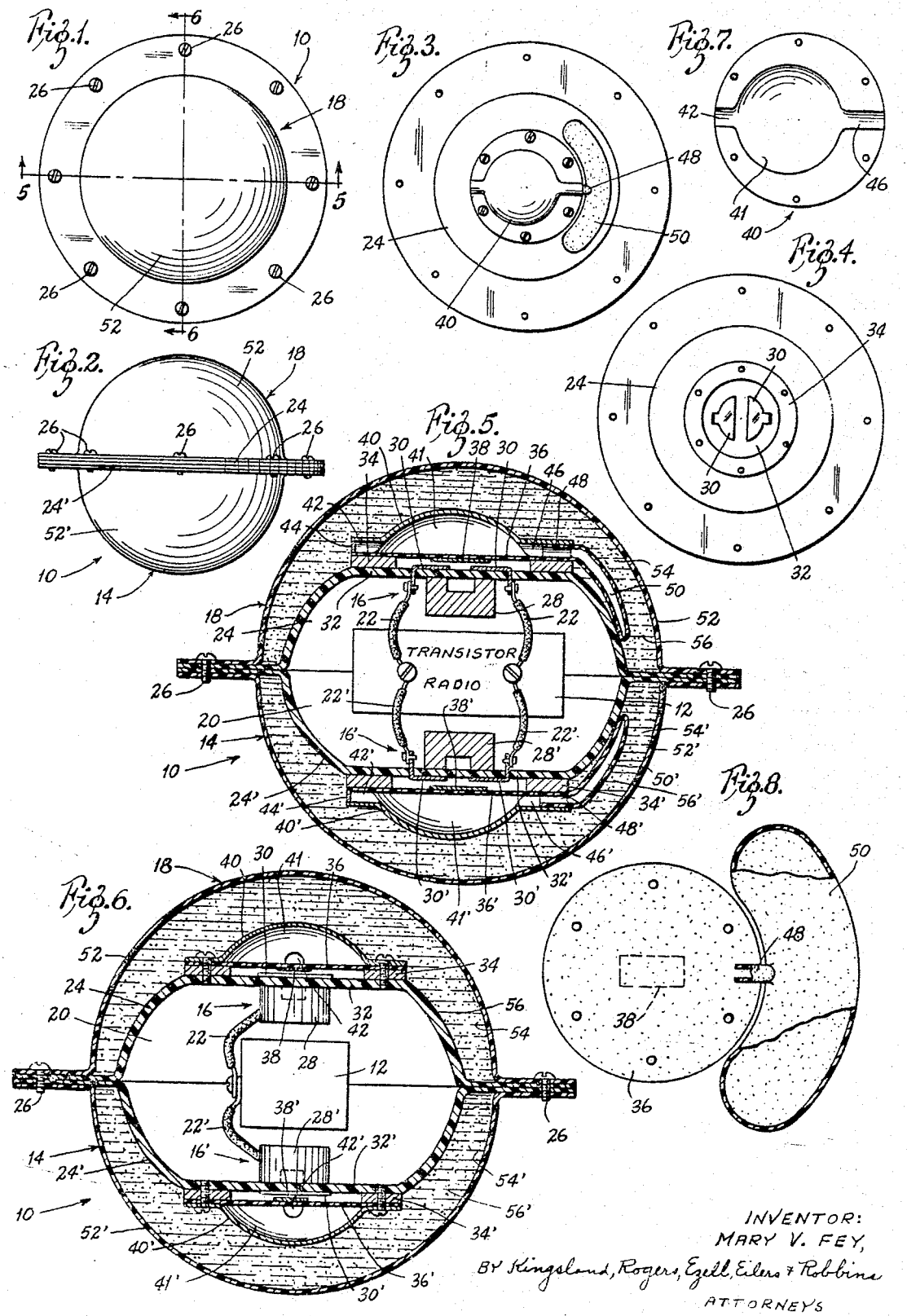
INVENTOR:
MARY V. FEY,
BY Kingsland, Rogers, Ezell, Eilers & Robbins
ATTORNEYS

United States Patent Office 3,335,239
Patented Aug. 8, 1967

3,335,239
MAGNETIC IMPACT SWITCH
Mary V. Fey, 5122 Washington Ave.,
St. Louis, Mo. 63108
Filed Nov. 19, 1964, Ser. No. 412,497
6 Claims. (Cl. 200—61.08)

This invention relates to improvement in magnetic impact switches and in particular relates to such switches for use in aircraft to energize a radio which may be activated upon crash of the aircraft for signalling purposes.

In the past, many aircraft have been lost and survivors have died because of the difficulty in locating the downed aircraft in mountains and other inaccessible terrain. Such crashes and loss of personnel are not restricted to aircraft, but apply also to other vehicles such as automobiles, which may run off of the shoulder of a rural road, crash, and then not be found for a long period of time, such that the injured personnel may not be rescued until too late. Attempts to provide safety signalling devices, which have been activated upon the crash of an airplane, have not been successful on a wide scale basis, and most planes are not equipped with such devices. Further, such devices that are available may take the form of a throw-off signalling radio, or the like, that may be attached to the fuselage of a plane and in the throw-off process damage can occur, or the crash of the plane can itself destroy the safety signalling device.

It is, accordingly, a principal object of this invention to provide a rugged magnetic impact switch which can activate a signalling radio that provides a signal upon the crash of the plane, or other type of vehicle, to enable searchers to pick up the signal and thereby locate the crash scene. Essentially, this invention takes the form of a pair of hemispherical casings, each having a flexible plastic hemisphere filled with fluidized iron particles, and in which the impact of the crash causes the particles to enter a chamber susceptible to a magnetic action to draw a magnetic switch into closing contact. This activates a transistor radio housed in the center of the two casings. The magnetic impact switch and the casing may be provided as a unitary element with the transistor radio signalling device therein. The entire unit is rugged to the point that when located in the fuselage of the plane, it will not easily be damaged upon impact, and will, as a matter of fact, withstand practically all aircraft or other vehicle crashes. The magnetic impact switch and the signal unit that it may energize are self contained and can be very simply positioned in the aircraft and require no rigorous maintenance or control of component parts, and can be left unattended.

The above features are objects of this invention and other objects will appear from the detailed description which follows and will be otherwise apparent to those skilled in the art.

For the purpose of illustration of this invention, a preferred embodiment is shown in the accompanying drawings. It is to be understood that these drawings are for the purpose of example only and that the invention is not limited thereto.

In the drawings:
FIGURE 1 is a top plan view of the safety signalling device;
FIGURE 2 is a view in side elevation of the device;
FIGURE 3 is a top plan view of the safety signalling device with the outer flexible plastic hemisphere removed;
FIGURE 4 is a top plan view of the safety signalling unit with the dome and bladder removed;
FIGURE 5 is an enlarged view in section taken on the line 5—5 of FIGURE 1 showing the internal construction of the unit;
FIGURE 6 is an enlarged view, partly in section, taken on the line 6—6 of FIGURE 1 showing further details of construction;
FIGURE 7 is an enlarged bottom plan view of the chamber dome shell; and
FIGURE 8 is a top plan view partly in section showing the connection of the bladder to the diaphragm.

Referring now to the drawings and FIGURES 1, 2, 5 and 6 in particular, the entire safety signalling device is referred to as a unit by the reference numeral 10, and is comprised of a transistor radio 12 positioned in the center of the bottom housing 14 between the magnetic impact switches, generally designated by the reference numerals 16 and 16', the former being positioned in the top housing 18 and the latter being positioned in the bottom housing 14. Since the construction of the magnetic switches in the two housings are identical, the same reference numerals will be employed for identical parts but with prime designations.

It will be understood that the transistor radio may be surrounded by packing of conventional types of cushioning material in the chamber 20 formed between the two housings within which it is positioned. A pair of leads 22 lead from the transistor radio to the magnetic impact switches 16 and 16', which are connected in parallel so that operation of either one will operate the radio.

The magnetic impact switch 16 is comprised of a rigid upper flanged hemispherical shell 24, which is connected to the bottom shell 14 by appropriate fasteners, such as the bolts 26. A permanent magnet 28 is connected to the bottom of the hemispherical shell underneath a pair of contacts 30, which are positioned on the top of the central portion 32 of the shell 24.

A spacer ring 34 is positioned on the raised medial portion of the rigid hemispherical shell to support a flexible diaphragm 36, which may be made of Mylar, or other synthetic film that has some degree of supporting capacity, so that it may support a short circuiting metallic shunt element 38 above and in spaced relation from the contacts 30 until the magnetic impact switch is actuated. A rigid dome member 40 is positioned upon the diaphragm and the spacer ring 34, as best shown in FIGURES 3, 5 and 6. This dome defines a chamber 41, which is adapted to be filled with fluidized iron particles suspended in a viscous carrier liquid, as will further appear hereinbelow, upon the crash of the aircraft to cause the actuation of the impact switch. The dome member 40 has a relatively narrow passageway 42 at one end, which is sufficiently constricted to resist the normal passage under ambient conditions, and under non-impact conditions of the fluidized iron particles. It will be understood that a plug 44 may be positioned in the end of the passage which is of such a nature that it may be easily burst by pressure of the fluidized iron particles created upon impact, and this may be employed when the viscosity of the fluidized iron particles is such that it is so low that it may otherwise enter the constricted passageway. The dome member 40 is further provided with a second passageway 46 at the opposite side, which receives a hollow stem 48 of pressure relief bladder 50, as best shown in FIGURES 5 and 8.

A flexible plastic hemispherical shell 52 of a greater diameter than the shell 24 is positioned over said shell to enclose it, and is connected to the unit as shown in FIGURES 5 and 6 by the aforementioned bolts. This shell defines a chamber 54 between said shell and the dome member 24, which is filled with fluidized iron particles suspended in the viscous carrier material such as one of the fairly viscous liquid silicones. This material is indicated by the reference numeral 56, and, as shown in FIGURES 5 and 6, completely fills the exterior of the support shell 24 in the dome member 40, but is excluded in normal, or safe operation, when the switch is not operated from the interior chamber 42.

Operation

In operation, the safety signalling unit is simply placed in a position of the aircraft or other vehicle that is desired to be protected. Such a position may be the tail portion of an airplane where the least damage is likely to occur to the unit, should the aircraft crash. When the aircraft does crash, the device resists any damage to the unit, since the flexible shell 52 of the top and bottom housings 14 and 18 are formed of very tough plastic materials.

For operation of the safety signalling unit, it will be assumed that a crash has occurred. Under these conditions, the force of the impact of the crash causes the flexible shell 52 (or 52' depending upon the direction of the impact) to be distorted and in the process of distortion and return of the flexible shell to its hemispherical condition, pressure will be exerted upon the fluid iron particles suspended in the silicone liquid. This silicone liquid, which is of a high viscosity, cannot normally enter the passageway 42, but when the pressure is applied, the liquid is forced into the interior of the chamber 41 to enter the chamber and travel over the diaphragm 36. Any displaced air within the chamber can be expelled through the other chamber 46 and into the pressure relief bladder 50, so that a balancing of the pressure within the chamber is effectuated.

Upon the entry of the silicone fluid with the fluidized iron particles suspended therein, the flexible diaphragm 36 is caused to be distended toward the magnet 38 by the magnet action exerted upon the iron particles. The shunt 38, which does not contain enough metal normally to overcome the flexibility of the diaphragm 36, is then attracted against the contacts 30 to complete the electrical contact with the transistor radio. The transistor radio then, with the circuit completed, is caused to send out signals of any appropriate type, either in a continuous wave or intermittent wave as may be desired.

It will be noted that in the operation of the magnetic impact switch upon the crash of the vehicle in which it is stored the fluidized iron particles suspended in the silicone will not return to the exterior chamber 54. Thus, the viscosity is such that any flow-out or flow-back is resisted. Further, the pressure relief bladder 50, when partially filled with air that may be in the chamber 42, creates a balanced pressure so that once the fluidized iron particles in the liquid carrier remain in said chamber, and the attraction of the magnet to the fluidized particles will keep the flexible diaphragm 36 operated in the make contact position for the switch to keep the radio in operation.

It will be readily understood that instead of using a liquid silicone any other viscous liquid carrier can be employed. Likewise, it will be understood that the size of the passageway 42 may be varied, depending upon the type of liquid employed, and that in these considerations the plug 44 may or may not be used as is desired, depending upon the background conditions.

Various changes and modifications may be made within this invention as will be readily apparent from the discussion above, and as will be readily apparent to those skilled in the art. Such changes and modifications are within the scope and teaching of this invention as defined by the claims appended hereto.

What is claimed is:

1. A magnetic impact or shock switch adapted to be actuated upon impact, said switch comprising a housing, a fixed normally open switch contact supported within said housing, means operable upon physical shock to said housing as occasioned by impact to close a movable switch element supported within said housing against said fixed switch contact, said means comprising a magnet mounted adjacent said fixed switch and magnetically attractive means normally positioned out of the magnetic field of said magnet but movable upon said shock force into cooperation with said movable switch element and into the field of the magnet and attracted thereby to move said movable switch into contact with said fixed switch.

2. A magnetic impact or shock switch adapted to be actuated upon impact, said switch comprising a housing, a fixed normally open switch contact supported within said housing, means operable upon physical shock to said housing as occasioned by impact to close a movable switch element supported within said housing against said fixed switch contact, said means comprising a magnet mounted adjacent said fixed switch and magnetically attractive means normally positioned out of the magnetic field of said magnet but movable upon said shock force into cooperation with said movable switch element and into the field of the magnet and attract thereby to move said movable switch into contact with said fixed switch, said magnetically attractive means comprising fluidized discrete magnetically attractive particles housed in a first chamber, said movable switch being housed in a second chamber, means normally blocking said magnetically attractive particles from said second chamber but permitting passage of said particles into the second chamber upon the creation of said shock force.

3. A magnetic impact or shock switch adapted to be actuated upon impact, said switch comprising a housing, a fixed normally open switch contact supported within said housing, means operable upon physical shock to said housing as occasioned by impact to close a movable switch element supported within said housing against said fixed switch contact, said means comprising a magnet mounted adjacent said fixed switch and magnetically attractive means normally positioned out of the magnetic field of said magnet but movable upon said shock force into cooperation with said movable switch element and into the field of the magnet and attracted thereby to move said movable switch into contact with said fixed switch, said magnetically attractive means comprising fluidized discrete magnetically attractive particles housed in a first chamber, said movable switch being housed in a second chamber, means normally blocking said magnetically attractive particles from said second chamber but permitting passage of said particles into the second chamber upon the creation of said shock force, said means further preventing passage of the particles away from the second chamber after they have entered it.

4. A magnetic impact or shock switch adapted to be actuated upon impact, said switch comprising a housing, a fixed normally open switch contact supported within said housing, means operable upon physical shock to said housing as occasioned by impact to close a movable switch element supported within said housing against said fixed switch contact, said means comprising a magnet mounted adjacent said fixed switch and magnetically attractive means normally positioned out of the magnetic field of said magnet but movable upon said shock force into cooperation with said movable switch element and into the field of the magnet and attracted thereby to move said movable switch into contact with said fixed switch, said magnetically attractive means comprising fluidized discrete magnetically attractive particles housed in a first chamber, said movable switch being housed in a second chamber, means normally blocking said magnetically attractive particles from said second chamber but permitting passage of said particles into the second chamber upon the creation of said shock force, said means further preventing passage of the particles away from the second chamber after they have entered it, said first chamber having a flexible outer wall distortable upon said shock force to exert pressure upon said fluidized particles and said second chamber being provided with pressure relief means to facilitate entry of said fluidized particles.

5. A magnetic impact or shock switch adapted to be actuated upon impact, said switch comprising a housing, a fixed normally open switch contact supported within said housing, means operable upon physical shock to said housing as occasioned by impact to close a movable switch element supported within said housing against said fixed switch contact, said means comprising a magnet mounted adjacent said fixed switch and magnetically attractive means normally positioned out of the magnetic field of said magnet but movable upon said shock force into cooperation with said movable switch element and into the field of the magnet and attracted thereby to move said movable switch into contact with said fixed switch, said magnetically attractive means comprising fluidized discrete magnetically attractive particles housed in a first chamber, said movable switch being housed in a second chamber, means normally blocking said magnetically attractive particles from said second chamber but permitting passage of said particles into the second chamber upon the creation of said shock force, said means further preventing passage of the particles away from the second chamber after they have entered it, said first chamber having a flexible outer wall distortable upon said shock force to exert pressure upon said fluidized particles and said second chamber being provided with pressure relief means to facilitate entry of said fluidized particles, comprising a normally collapsed bladder positioned in said first chamber and having a passageway communicating with the second chamber.

6. A magnetic impact or shock switch adapted to be actuated upon impact, said switch comprising a housing, a fixed normally open switch contact supported within said housing, means operable upon physical shock to said housing as occasioned by impact to close a movable switch element supported within said housing against said fixed switch contact, said means comprising a magnet mounted adjacent said fixed switch and magnetically attractive means normally positioned out of the magnetic field of said magnet but movable upon said shock force into cooperation with said movable switch element and into the field of the magnet and attracted thereby to move said movable switch into contact with said fixed switch, said magnetically attractive means comprising fluidized discrete magnetically attractive particles housed in a first chamber, said movable switch being housed in a second chamber, means normally blocking said magnetically attractive particles from said second chamber but permitting passage of said particles into the second chamber upon the creation of said shock force, said movable switch being supported upon a flexible diaphragm forming a wall of said second chamber.

References Cited

UNITED STATES PATENTS

| | | | |
|---|---|---|---|
| 2,519,553 | 8/1950 | Faulkner | 325—114 |
| 3,049,601 | 8/1962 | Hardesty | 200—61.08 X |
| 3,123,801 | 3/1964 | Bosler | 325—114 |
| 3,205,322 | 9/1965 | Reed | 200—61.08 |
| 3,251,033 | 5/1966 | Lawyer | 340—52 |

JOHN W. CALDWELL, *Acting Primary Examiner.*